United States Patent [19]

Müller et al.

[11] 4,375,365

[45] Mar. 1, 1983

[54] CENTRIFUGAL CHAMBER FILTER FOR SEPARATING SOLIDS FROM A GAS STREAM

[75] Inventors: Friedrich-E. Müller, Eisdorf; G. Wolfgang Oesterwind, Osterode; Jürgen Nothdurft, Clausthal-Zellerfeld, all of Fed. Rep. of Germany

[73] Assignee: Anton Piller GmbH & Co. KG, Fed. Rep. of Germany

[21] Appl. No.: 344,947

[22] Filed: Feb. 2, 1982

[30] Foreign Application Priority Data

Feb. 5, 1981 [DE] Fed. Rep. of Germany ....... 3103947

[51] Int. Cl.³ .............................................. B01D 45/12
[52] U.S. Cl. ........................................ 55/346; 55/414; 55/461; 210/512.2; 209/144
[58] Field of Search ................................. 55/345–349, 55/461, 413, 414, 459 R; 209/144; 210/512.2

[56] References Cited

U.S. PATENT DOCUMENTS 3,948,771 4/1976 Bielefeldt .............................. 55/461
4,001,121 1/1977 Bielefeldt .............................. 55/461
4,205,965 6/1980 Bielefeldt ........................... 55/459 R

FOREIGN PATENT DOCUMENTS 933936 8/1963 United Kingdom .................. 55/346

Primary Examiner—Bernard Nozick
Attorney, Agent, or Firm—Gottlieb, Rackman & Reisman

[57] ABSTRACT

A multi-stage centrifugal chamber filter for separating solids from a gas stream. The filter has a plurality of separate multistage filter elements, each having at least one flow channel to which a plurality of centrifugal chambers is connected. The cross-section of the flow channel decreases in the direction of flow from chamber to chamber in order to provide a constant velocity of flow. The inlet and the outlet of the or each flow channel are designed to be in opposite end walls of the filter elements. A plurality of filter elements are located in a filter housing between two parallel walls spaced apart in the housing. Passages are provided in the walls for opposing inlets and outlets of the filter elements. The filter housing has at least one purified-gas outlet between the walls. The inlets and outlets of the filter elements are connected outside the walls to a crude-gas inlet and a residual-gas outlet respectively.

11 Claims, 13 Drawing Figures

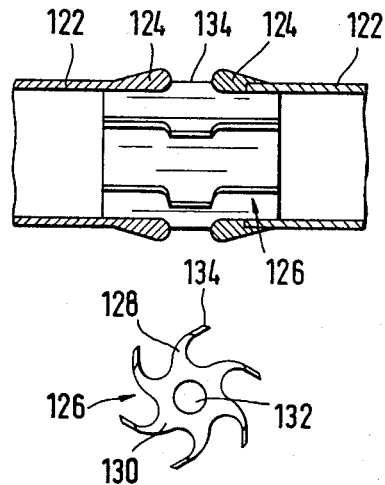 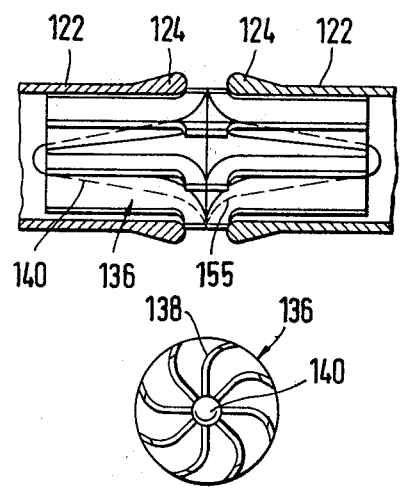
FIG. 8    FIG. 9
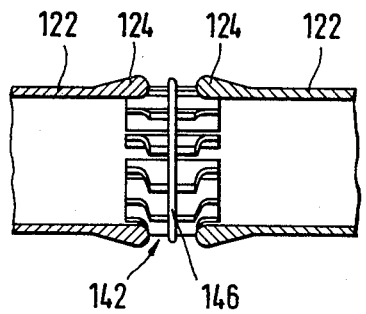 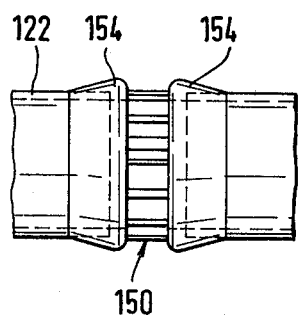
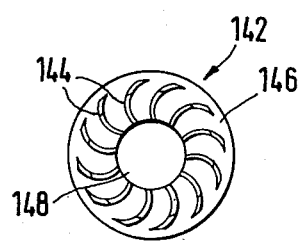 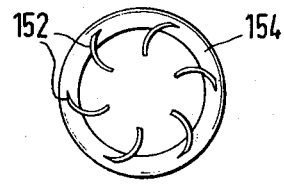
FIG. 10    FIG. 11

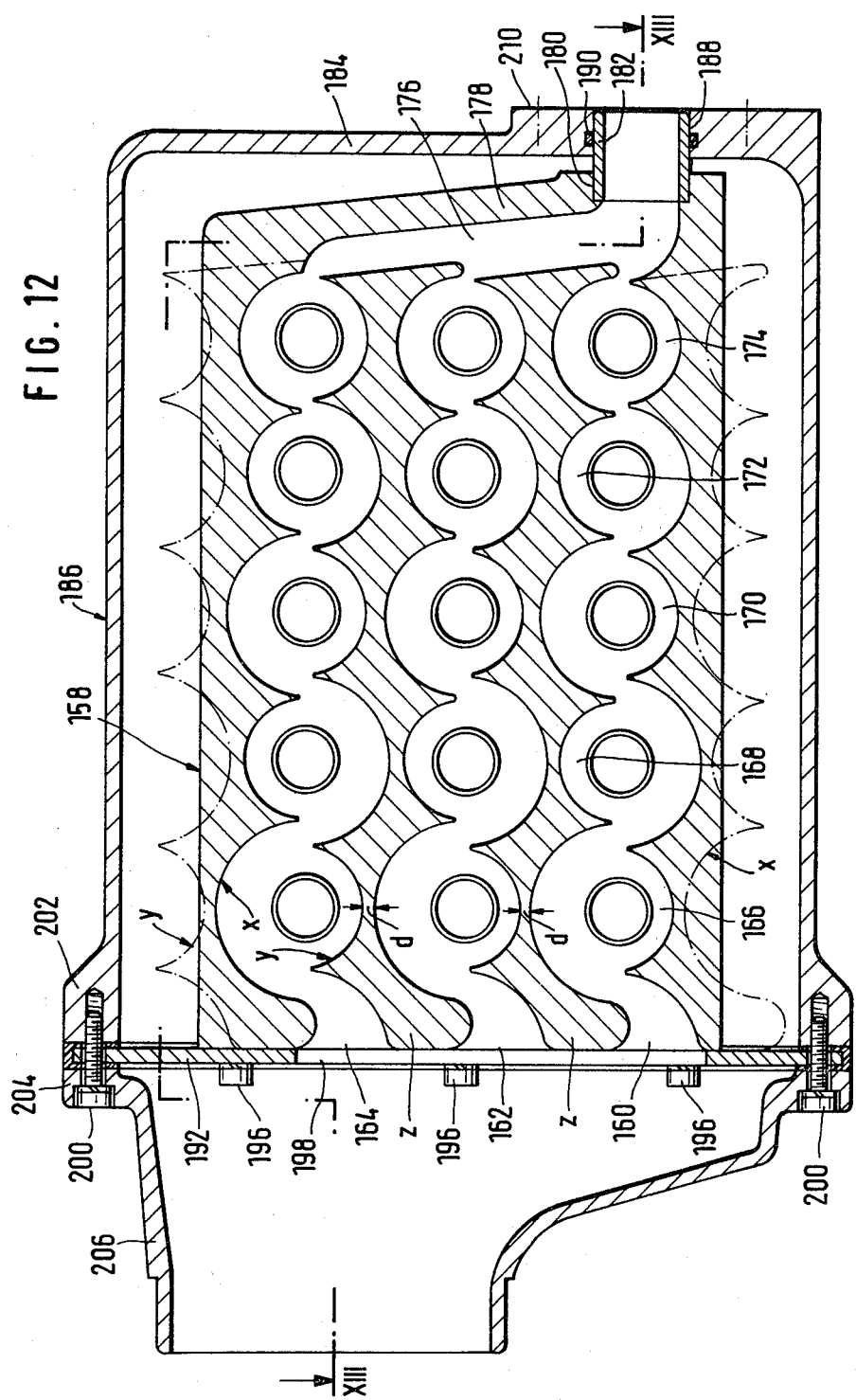

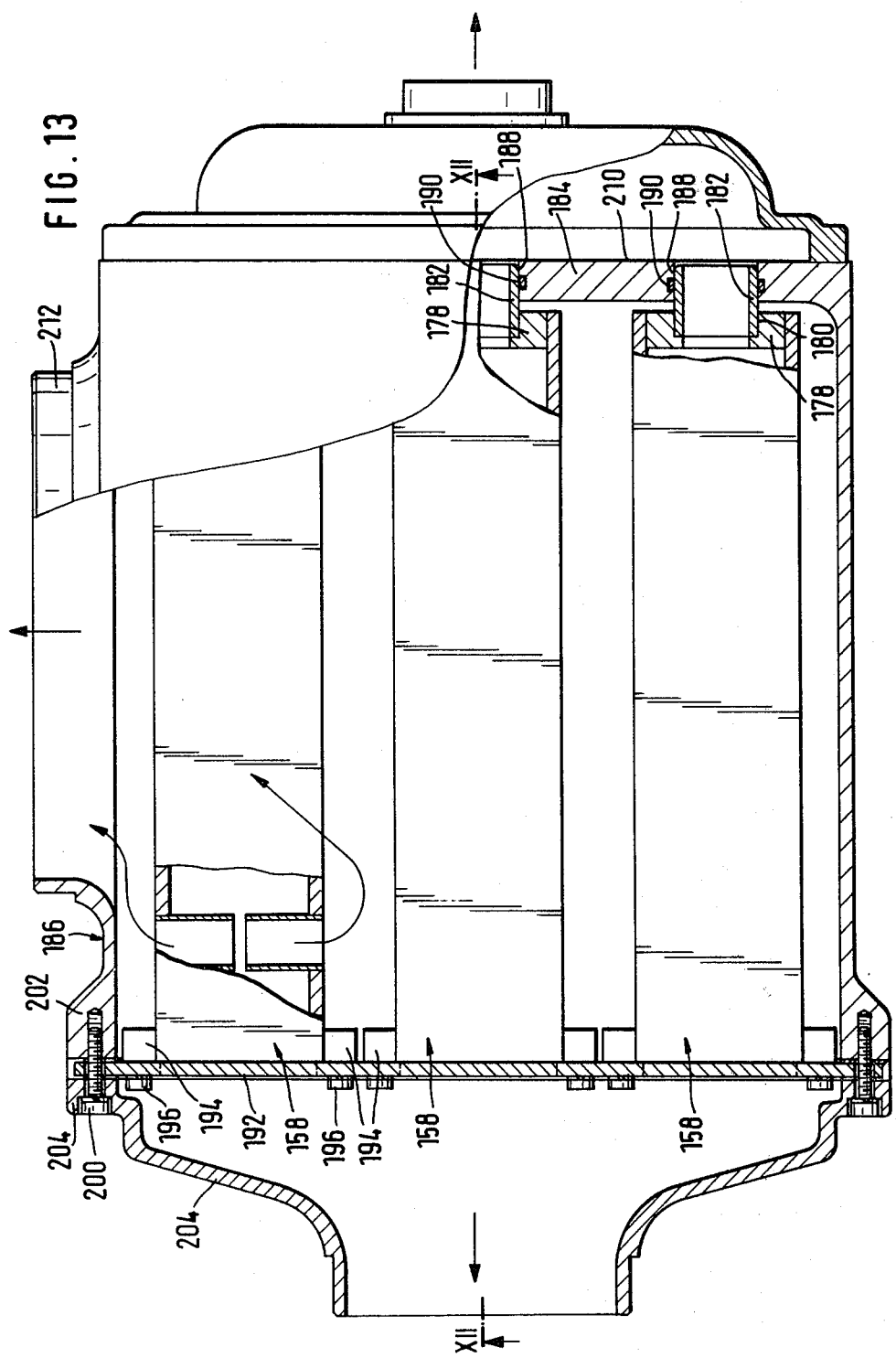

CENTRIFUGAL CHAMBER FILTER FOR SEPARATING SOLIDS FROM A GAS STREAM

FIELD OF THE INVENTION

The invention concerns a filter for separating solids suspended in a gas stream by means of centrifugal force, the filter having parallel flow channels and a plurality of centrifugal chambers, each of which adjoins a flow channel with a trailing edge and a leading edge and between these edges is open over part of its wall area to the flow channel; each chamber having two outlet pipes which are disposed coaxially in the chamber and extend towards each other from end walls of the chamber and are connected to a purified gas outlet.

DESCRIPTION OF THE PRIOR ART

Filters having centrifugal chambers are distinguished in that a high degree of separation is achievable with them. It is known to construct such filters to have several stages and a plurality of parallel flow channels (DE-OS Nos. 21 60 414 and 22 26 514). The known designs of such filters have a relatively large inactive structural volume and therefore a relatively large installation volume for a given performance. Moreover their manufacture is costly.

An object of the invention is to develop filters of this kind further, in such a way that filters of various capacity can be made at low cost and with a small installation volume.

SUMMARY OF THE INVENTION

According to the invention, this problem is solved in that the filter comprises a plurality of separate multistage filter elements in each of which there is at least one of said flow channels and a plurality of said centrifugal chambers communicating with the flow channel, the cross-sectional area of the flow channel reducing from chamber to chamber according to the desired flow velocity, the filter element having an inlet and an outlet in respective end walls of the filter element, the filter also comprising a filter housing; two opposite walls spaced apart in said filter housing and between which said filter elements are located, said opposite walls having passages therein with which the respective inlets and outlets of the flow channels of the filter elements communicate, the filter housing having at least one purified gas outlet communicating with the space within the filter housing between said opposite walls therein and through that space with the outlet pipes of the centrifugal chambers of the filter elements and having outside one of said opposite walls a crude gas inlet communicating with the inlets of the flow channels of the filter elements and outside the other of said opposite walls a residual gas outlet communicating with the outlets of the flow channels of the filter elements.

Each filter element may be substantially straight, the centrifugal chambers communicating with one side of the flow channel. Alternatively, each flow channel may be curved in an undulatory manner within the filter element, the centrifugal chambers thereof communicating with the flow channel in the concave regions of the latter. Other optional features of the filter are described hereinafter.

A particular advantage of the filter provided by the invention consists of the fact that by using a required number of basic filter element, filters of different capacity can be assembled and only the filter housing has to be suitably adapted.

BRIEF DESCRIPTION OF THE DRAWINGS

Embodiments of a filter in accordance with the invention are illustrated in the drawings and described in the following description by way of example. In the drawings:

FIGS. 8 to 11 each show a different embodiment, in axial cross-sectional and end views of adjacent inlet ends of two outlet pipes and a distributor for the "untwisting" of the purified gas flow;

FIG. 12 is a section along the line X11—X11 in FIG. 13 of a further embodiment of a filter in accordance with the invention, and FIG. 13 is a section through the filter shown in FIG. 12 along the line X111—X111 therein.

DESCRIPTION OF THE PREFERRED EMBODIMENTS

Figure 1:
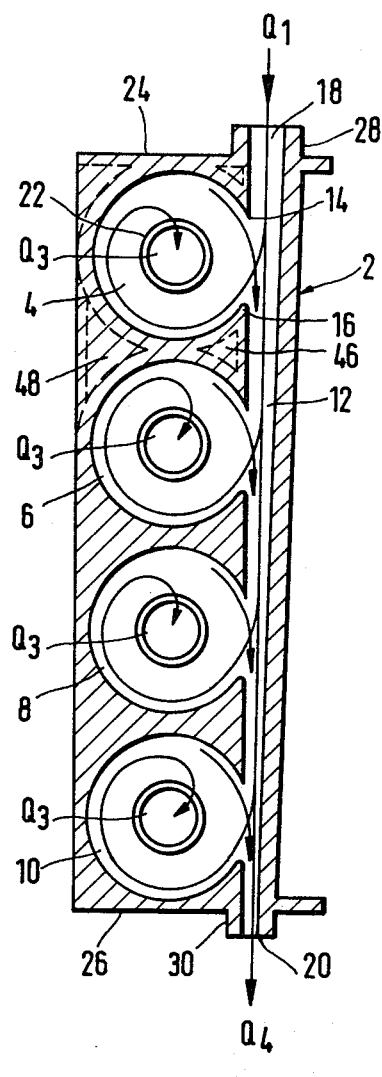
FIGS. 1 and 2 each show longitudinal sections through four-stage single-channel filter elements.
Figure 2:
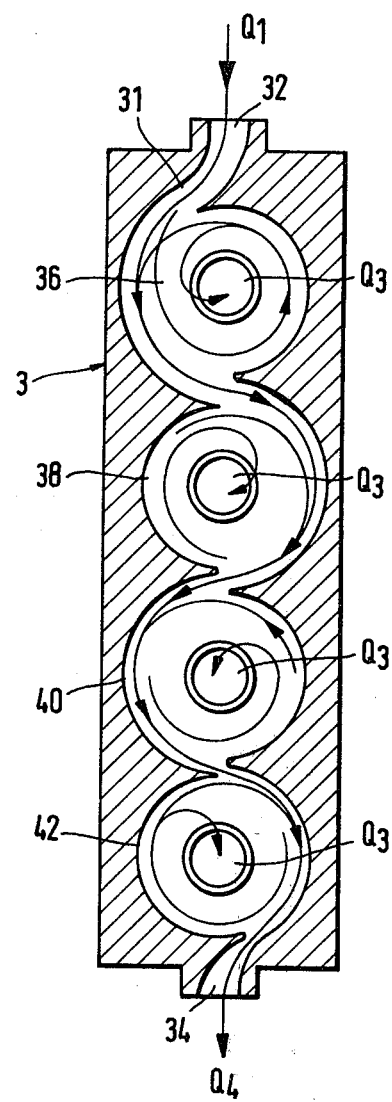

In FIGS. 1 and 2 two basic embodiments of single-channel filter elements are shown in the manner in which they are installed in filters for separating suspended solids from a gas stream by centrifugal force.

The single-channel filter element 2 in FIG. 1 is constructed in four stages with successive chambers 4, 6, 8, 10 and a straight flow-channel 12 to which the centrifugal chambers 4, 6, 8, 10 are connected in each case with a sharp trailing edge 14 and a blunt leading edge 16. The cross-sectional area of the flow channel 12 is graded down between the inlet 18 and the outlet 20 from chamber to chamber in such a way that an equal flow velocity is achieved for all of the chambers. The volume Q1 of the flow to be purified is reduced during this by the purified gas flow volume Q3 which issues from the outlet pipes 22 which extend towards each other from walls of the generally cylindrical chamber. The flow volume, reduced by the purified gas flow volume Q3, from a chamber enters the successive chamber and is again diminished by the purified gas flow volume Q3 issuing from the outlet pipes thereof. The residual gas flow volume Q4, containing the solids, emerges at the outlet 20. The inlet and outlet cross-sectional areas of the chambers are so designed that the same flow velocities prevail everywhere.

The mode of operation of centrifugal chambers having outlet pipes, for the separation fo suspended solids in a gas stream by centrifugal force, is known as such (DE OS 2160415) and does not need any further description here.

The housing in which the centrifugal chambers are constructed presents two opposite narrow ends 24, 26 which are designed to be planar and parallel to each other at least in the region of the inlet and outlet of the flow channel 12. On the ends 24, 26, generally rectangular inlet and outlet apertures 18, 20 are provided, each of which is provided with a circular collar 28, 30 by which they can be mounted in a filter housing in the manner described hereinafter.

In the embodiment of FIG. 2, the single-channel filter element 3 is constructed in four stages. The flow channel 31 having an inlet 32 and an outlet 34 is led around the centrifugal chambers 36, 38, 40, 42 in an undulatory manner, so that the flow through each chamber is in the opposite direction to that in the preceding or subsequent chamber. The crude-gas flow volume Q1 is reduced in each centrifugal chamber by the purified gas flow volume Q3. In order to achieve a constant flow velocity between the inlet 32 and the outlet 34, the cross-sectional area of the flow channels are correspondingly reduced between each pair of adjacent chambers. Each chamber has a sharp trailing edge and a blunt leading edge. A projecting collar is provided on each of opposite ends of the element 3 around the inlet 32 and the outlet 34.

Figure 3:
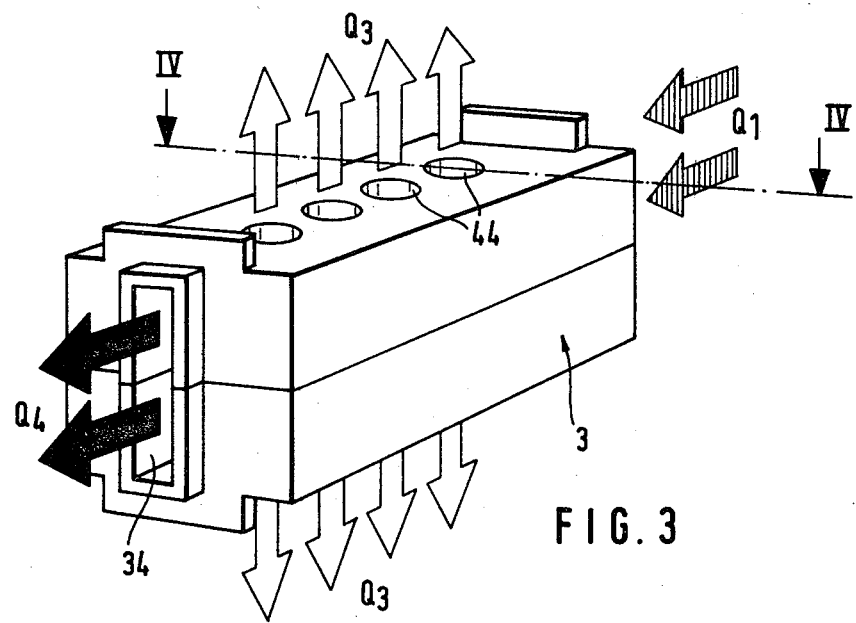
FIG. 3 shows schematically, in a perspective view, the gas flows in a filter element as shown in FIGS. 1 or 2.
Figure 4:
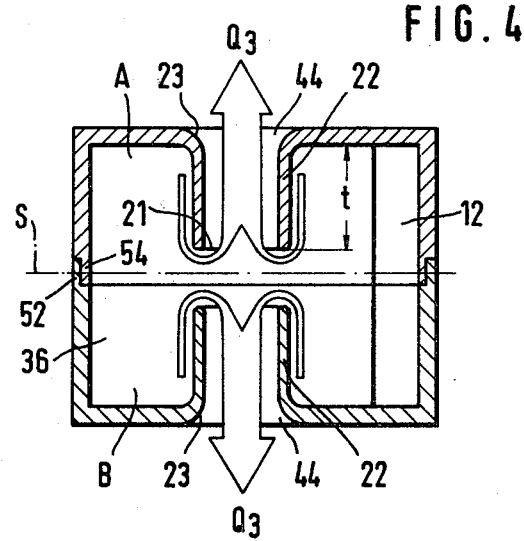
FIG. 4 is a section along the line IV—IV in FIG. 3.

FIGS. 3 and 4 show schematically the operation of the filter elements shown in FIGS. 1 or 2, the particular embodiment being unimportant for the mode of functioning. The crude gas Q1 flows into the filter element at the inlet which is not visible in FIG. 3. The purified gas issues from the orifices 44 of the outlet pipes 22, the orifices 44 being situated in the opposing long sides of, for example, the filter element 3, and the residual-gas stream Q4, enriched with solids separated in the centrifugal chambers, issues from the outlet 34. In FIG. 4, the flow channel with the sharp leading edge 14 of the centrifugal chamber 4 is reproduced. The purified gas streams which issue on both sides from the outlet pipes 22 are indicated by the arrows Q3. The outlet pipes 22 are preferably provided with nozzle-shaped outlets 23.

At the inlet ends 21, the outlet pipes 22 are designed with rounded edges. To simplify manufacture, the filter elements 2 are preferably made in two parts divided along their line of symmetry S, as indicated in FIG. 4. In this way the filter elements can be produced in the form of parts which are mirror images one with another, whereby these parts do not have undercuts and therefore can be cast in simple two-part moulds. The two parts A and B can for instance be produced from plastics by injection moulding or by metal die casting. Thereby it is possible to achieve a high surface finish for all the flow channels and in particular for the walls of the centrifugal chambers. Thereby it is moreover possible to avoid accumulations of material through development of cavities 46, 48 which are open towards the joint face. Such cavities 46 and 48 are shown dotted in FIG. 1 between the centrifugal chamber 4 and 6. The cavity 48 in FIG. 1 may also be open towards the left-hand side of the filter element. The wall would here follow the contour of the centrifugal chambers. In the region of the line of separation of the two parts, flanges may be cast adjacent to the line of separation, and the flanges may fill in the wedge between each pair of adjacent centrifugal chambers. In the same way flanges could be cast on the right-hand side of the filter element 2 in the region of the line of separation, and these flanges could extend over the whole length of the filter element, or be made in the form of a short flange section.

In the areas of contact, overlapping projections 52, 54 can be provided as indicated in FIG. 4. Such projections can serve for centring and for better sealing.

The two mould parts A and B from which the filter elements are composed can be joined either detachably or non-detachably to each other. For non-detachable connection cemented joints are suitable. Detachable connections, for example with the aid of screw connections through the above-mentioned flanges adjacent the line of separation S, may be advisable for inspection and cleaning purposes.

Figure 5:
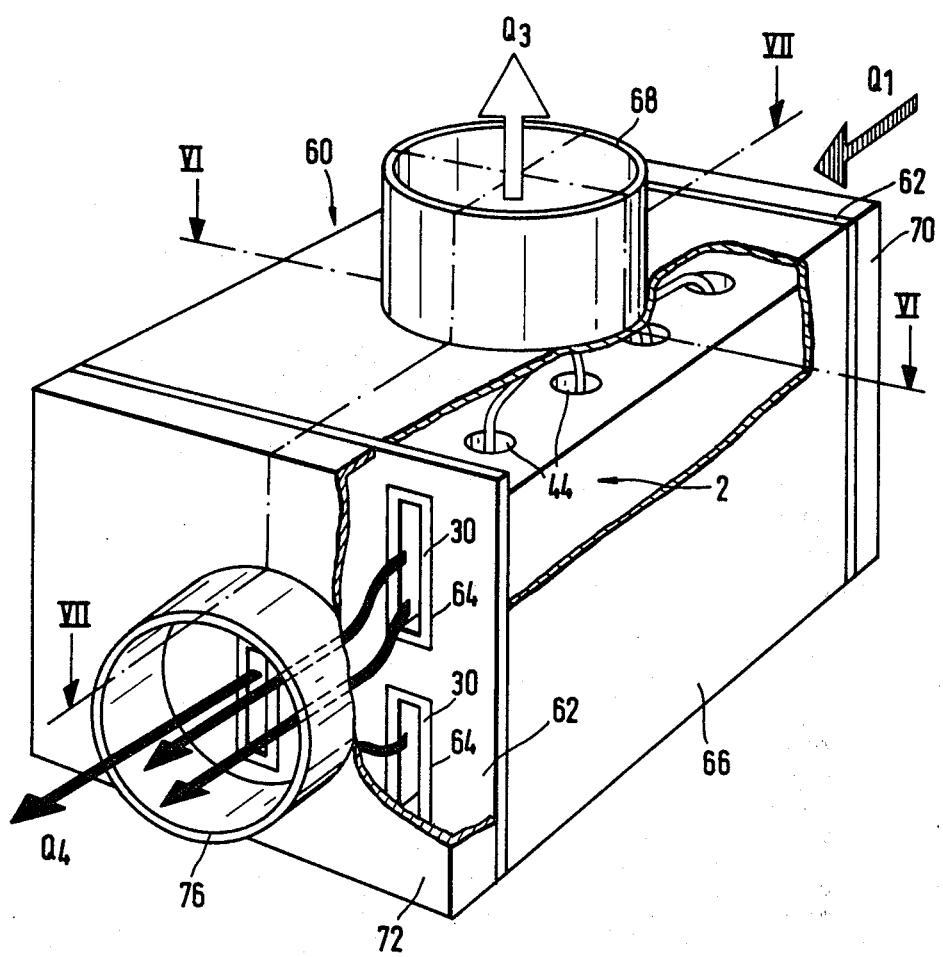
FIG. 5 shows in perspective view, and partly in section, the filter in accordance with the invention with a housing in which a plurality of filter elements is disposed.

Filter elements of the kind described in combination with a filter housing, may be assembled into filter aggregates of various capacities. Such a filter aggregate is exemplified in FIGS. 5 to 7. The filter housing 60 is provided with two spaced apart walls 62 having apertures 64 formed in each into which the centring collars 28, 30 of the filter elements 2 can be inserted. The filter elements 2 are here supported between the two end walls by the centring collars 28, 30 in such a way that they are situated at the prescribed distance apart. An elastic seal can be arranged around each centring collar 28, 30; the seal resting against the inside of the adjacent end wall. It is also possible to fix appropriate seals on the end walls.

Figure 6:
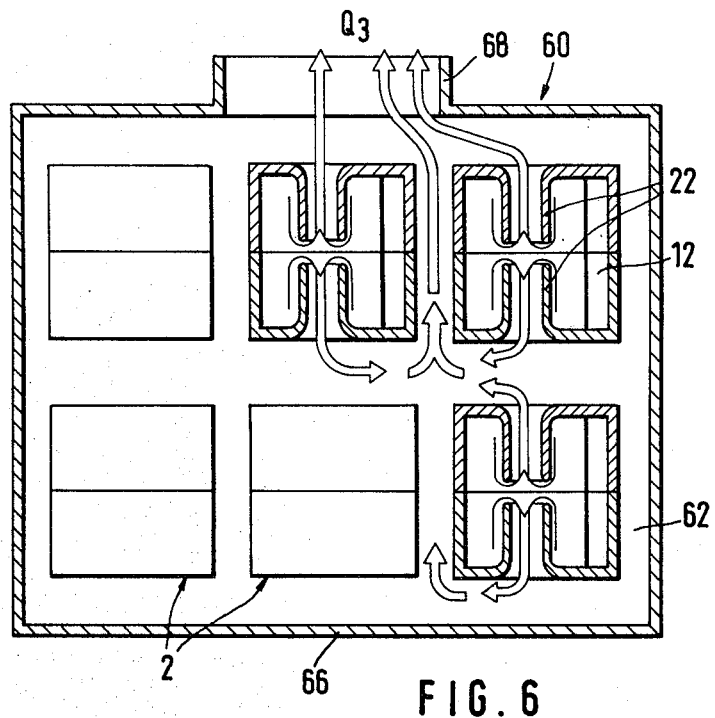
FIG. 6 is a section along the line VI—VI in FIG. 5.
Figure 7:
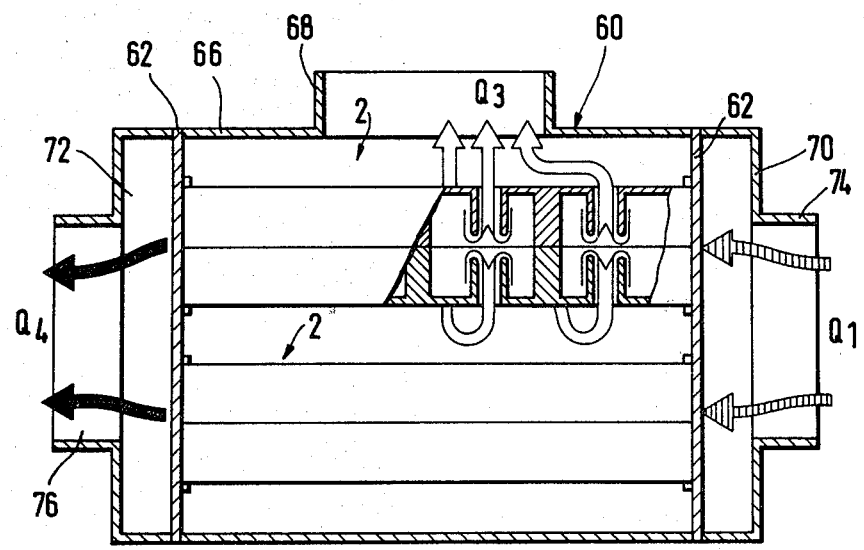
FIG. 7 is a section along the line VIII—VIII in FIG. 5.

Between the two end walls 62, the filter elements 2 are surrounded by a housing 66 which is situated at a distance from the individual filter elements, so that, as can be seen in FIGS. 6, 7, the filter elements are spaced on all sides from the housing 66 and the end walls 62, so that flow channels are formed within the space enclosed by the housing 66 and the end walls 62 through which the purified gas emerging from the outlet pipes 22 can flow unimpeded. The housing 66 is furnished with at least one purified gas outlet connection 68 for the purified gas outlet.

On the inlet and outlet ends of the filter elements a housing chamber 70, 72 is provided outside the walls 62 and these chambers are provided respectively with a crude gas inlet connection 74 and a residual crude gas outlet connection 76. The inlet and outlet chambers 70, 72 are shown in the FIG. 7 as parallelipipeds. It is however possible to form the chamber 70 with a flow-enhancing feedhead, in order to ensure that all the filter elements are evenly supplied with crude gas. The same holds true for the outlet chamber 72. The construction of the inlet and outlet chambers is further dependent on whether the filter aggregate is to be planned for suction operation or for pressure operation. With pressure operation the crude gas is fed into the inlet 74 via a blower which is connected on its delivery side to the inlet. With suction operation, a blower is connected on its suction side to each of the purified gas outlet 68 and the residual gas outlet 76.

The installation attitude is not critical for regular operation of the filter aggregate. A horizontal assembly can be provided, as shown in the drawings. An arrangement may also be provided such that either the inlet or the outlet is positioned underneath the filter. Also sloping fitting positions are possible. An installation attitude with the outlet facing downwards may be advisable where, for example, there is a risk of radioactivity loaded dusts being deposited in the outlet chamber and it must be ensured that they do not accumulate. Differing from the presentation of FIGS. 6 and 7 the filter elements may be arranged with their outer surfaces located parallel to the axes of the outlet pipes 22 and directly resting against each other.

Filter aggregates of the kind according to the invention and described hereinbefore can be manufactured in different sizes. It is in particular possible to manufacture light-weight and small filters such as are installed to ventilate vehicles and the like, in which usually the available space for installation, and the additional load due to the filter, are critical. Also stationary filters for de-dusting can be manufactured simply and economically in accordance with the invention.

With filters as provided by the invention, a large capacity range of filters can be produced with only a few basic filter elements designed as the critical filter components. Different capacities are provided in each case by parallel connection of filter elements and only the housings need to be designed to suit a particular application. The housings are usually of relatively simple sheetmetal construction, which can, in a simple manner, be fabricated in accordance with the number of filter elements to be accommodated in each case.

In FIGS. 12 and 13 a centrifugal chamber filter is illustrated with which, as a variation from the embodiment described hereinbefore, the individual filter elements 158 each have a plurality of flow channels each having a plurality of centrifugal chambers. In the example, three parallel flow channels 160, 162 and 164 are provided, to each of which are connected five centrifugal chamber 166, 168, 170, 172 and 174 in series. Here the flow channel is led around the centrifugal chambers in an undulatory manner as in the embodiment according to FIG. 2, so that the streams through successive centrifugal chambers are in opposite directions.

As can be seen from FIG. 12, such a multi-channel filter element 158 can be constructed with more economy of space than three single-channel filter elements, as in FIG. 2. In the example illustrated, an external contour of the flow channel always lies opposite in each case to the external contour of a centrifugal chamber having a smaller radius.

The individual channels can here be pushed together to such an extent that in the region of the centrifugal chamber 166 only a simple minimum wall thickness needs to be provided for the wall thickness d, whereas when two single-channel filter elements are disposed in this region the wall thickness must be at least double that dimension.

The multi-channel filter element as in FIGS. 12 and 13 is also preferably manufactured as a two-part precision casting, for example by injection moulding or die casting, as described above with reference to FIGS. 1 and 2. These casting processes require a wall thickness as uniform as possible. This may also be achieved by making suitable recesses.

The contours x and y which define the flow channels and the centrifugal chambers are identical for all three channels 160 to 164. This means that the wall elements z between the channels 160 and 162, and 162 and 164 respectively are identical. Thereby it is possible, for example, to construct a filter element as in FIG. 12 by using castings corresponding to the wall elements z. One mould for this wall element z would then suffice for the production of a filter element. For the fabrication of a three-channel filter element, as illustrated in FIG. 12, four similar castings would then be needed, which would be fixed at the appropriate distance apart between two parallel plates, which latter at the same time carry the outlet pipes. The fixing may be done either by using a cement or by screwing. The castings on the outside with their contour x (above) or y (below) would then project with points above the required minimum height. These protruding points, which are shown by broken lines in the diagram, can be rough-worked from the castings, preferably after the filter element has been installed. The remaining parts of the x and y contours shown by the broken lines can be screened by a metal plate if that should be necessary.

At the right-hand ene of the filter element 158, the flow channels 160, 162, and 164 issue into a collecting main 176 constructed inside the filter element. In a lower part of the end wall 178 of the filter element, a connection drilling 180 is provided, in which a connection piece 182 is fitted. In the end wall 184 of the filter housing 186 a drilling 188 is provided, into which the connection piece 182 can be inserted. The sealing is effected by an O-ring 190. Instead of the collecting main 176, a separate connecting piece may be provided for each flow channel, and this in each case can be inserted into a drilling in the housing wall and sealed there.

When a collecting main is disposed in the filter element 158, the contours of the z castings are no longer identical in this region. All the same, in order to be able to assemble such a filter element from identical z castings, additional elements can be provided for the construction of the collecting main 176, these elements having a simple surface contour and being machinable at low cost.

A multi-channel filter element assembled from separate castings may be advisable especially with large sizes, in order to keep down the tooling costs.

At their left-hand ends, the filter elements 158 are fixed side-by-side to a common mounting plate 192. For this, as shown in FIG. 13, the filter elements can be provided with flanges 194 in which tapped holes are provided into which fixing screws 196 are screwed through the common mounting plate 192. In the region of the flow-channel inlets of the individual filter elements, the mounting plate is provided with apertures 198.

As a result of fixing the filter elements to the common mounting plate 192, which at the same time forms a closure for the housing 186, all the filter elements can be removed together from the housing, or inserted together into it. The mounting plate 192 is supported, through screws 200, between a flange 202 of the filter housing 186 and a flange 204 of the housing cover which forms the air inlet.

On the outlet side, the drilling 188, situated side-by-side, open into a flange 210 formed in the wall 184 of the housing. To this flange a transverse collecting main can be connected, which passes over into a dust-outlet aperture, which preferably has a circular cross-section.

A purified-air outlet connection 212, shown in FIG. 13, is provided in a side wall of the filter housing 186.

Particularly with filter elements having larger chamber diameters, in order to reduce the pressure drop it may be necessary to provide means for converting the rotational energy of the purified gas stream issuing from each chamber into pressure energy. Distributors can be provided between the outlet pipe ends for this purpose.

As can be seen in FIG. 4, the outlet pipes 22, directed towards one another, are situated with their ends a distance apart. The purified gas enters the outlet pipes 28 in the intermediate space between their ends. For conversion of the rotational energy of the purified gas, radial distributors can be disposed between the adjacent outlet pipe ends, as shown in FIGS. 8 to 11 in four different embodiments and as now described.

In the embodiment shown in FIG. 8, rings 124 are mounted or formed on the ends of the outlet pipes 122. For outlet pipes which are made separately and afterwards joined to the centrifugal chamber, such nozzle rings can be made integral with the outlet pipes, as shown at the left-hand side of FIG. 8. For filter elements in which the centrifugal chambers are cast in two halves of one piece, such a nozzle ring would form an undercut. For such an embodiment, the nozzle ring will advantageously be formed separately and slipped on. The nozzle rings 124 can be made with high precision by injection moulding or die casting, and they can be joined to the outlet pipes by for example cementing.

In FIG. 8 a distributor 126 is disposed between the two outlet pipe ends formed by the nozzle rings 124. The distributor 126 is situated symmetrically with respect to the outlet pipe ends and extends by a limited distance into them. As can be seen from the end view of the distributor 126 shown in the lower part of FIG. 8, the distributor has curved guide-vanes 128 which are spaced apart around the periphery and originate from a core 130 which at its centre is provided with a longitudinal throughway 132. A blank for such a distributor can be produced by continuous casting or by extrusion. The external diameter of the guide vanes 128 is so chosen that the outer edge or free end 134 of the guide vanes (as shown in upper part of FIG. 8) has a diameter approximately equal to the diameter at the region of closest spacing of the two nozzle rings. Adjoining this section, the guide vanes are bent over on the outside according to the internal contour of the nozzle rings and the outlet pipes 122, so that they can be inserted generally without a gap with the vanes fitting into the outlet pipe ends. The vane curvature is directed oppositely to the direction of swirl of the purified gas flow. The reaction pressure may, for example, be absorbed by inserting the distributor 126 into at least one of the outlet pipes 122 with a press fit. For assembly the distributor is inserted into one of the outlet pipes. When the chamber is closed by the second chamber part, the end of the other dip pipe is guided over the adjacent end of the distributor.

In the embodiment shown in FIG. 9, nozzle rings 124 are disposed at the ends of the outlet pipes 122, and these can be slipped on. The distributor 136 has guide vanes 138 which engage in a similar way in the intermediate space between the nozzle rings and moreover are bent over according to the diameter of the outlet pipes. In the embodiment shown in FIG. 9, from the intermediate space between the nozzle rings there originate conical guides 140 which pass through the guide vanes and taper into the outlet pipes in the direction of flow. At their feet which are in contact with one another, these guide are provided with entrance curves 155. In the end view (i.e., the lower part of FIG. 9) the rounded point of such a guide cone 140 can be seen. Distributors as shown in FIG. 9 can be produced by injection moulding or by die casting.

In the embodiment shown in FIG. 10, a distributor 142 is provided which has guide vanes 144 which in the vicinity of the nozzle rings 124 extend into the narrowest cross-section and moreover are matched to the internal contour of the outlet pipe ends. The blading 144 is arranged on a disc 146 which is centrally situated in the intermediate space between the nozzle rings and extends beyond the outer periphery of the blading. The disc 146 may be provided with an opening 148 at its centre. Also this type of distributor may be produced by injection moulding or by die casting.

With the embodiment shown in FIG. 11, a distributor 150 is provided having guide vanes 152 which are fixed on one of the nozzle rings 154 which may be mounted on the ends of the outlet pipes. In a preferred embodiment, the guide vanes 152 are fixed alternately on one of the two nozzle rings, so that the two nozzle rings together with their vanes produce the overall blading. Also nozzle rings of this kind may be made by injection moulding or by die casting. It is possible to fix the guide vanes only in the region of the front of the nozzle rings. However they may also be mounted with their fixing edge inside the nozzle ring itself by a limited extent, and (as in the other embodiments) extend into the outlet pipe.

The depth of insertion of the blading of the distributors into the outlet pipe ends can be chosen according to the prevailing requirements.

By means of the distributors, in accordance with the invention, the rotational energy of the purified gas flow entering the outlet pipes is converted into pressure energy and thereby the pressure drop in the filter is reduced. This conversion is made possible without additional structural bulk and can therefore be realised with economy of space. Moreover, the production cost for the distributors is relatively low.

What I claim as my invention and desire to secure by Letters Patent of the United States:

1. A filter for separating, by centrifugal force, solids suspended in a gas stream, the filter being of the kind having parallel flow channels and a plurality of centrifugal chambers each of which adjoins a flow channel with a trailing edge and a leading edge and between these edges is open to the flow channel over part of its wall area; each chamber having two outlet pipes therein which are disposed coaxially in the chamber, which extend towards each other from the end walls of the chamber and which are connected to a purified gas outlet, the filter comprising a plurality of separate multistage filter elements in each of which there is at least one of said flow channels and a plurality of said centrifugal chambers communicating with the flow channel, the cross-sectional area of the flow channel reducing from chamber to chamber according to the desired flow velocity, the filter element having an inlet and an outlet in respective end walls of the filter element, the filter also comprising a filter housing; two opposite walls spaced apart in said filter housing and between which said filter elements are located, said opposite walls having passages therein with which the respective inlets and outlets of the flow channels of the filter elements communicate, the filter housing having at least one purified gas outlet communicating with the space within the filter housing between said opposite walls therein and through that space with the outlet pipes of the centrifugal chambers of the filter elements and having outside one of said opposite walls a crude gas inlet communicating with the inlets of the flow channels of the filter elements and outside the other of said opposite walls a residual gas outlet communicating with the outlets of the flow channels of the filter elements.

2. A filter as claimed in claim 1 in which the flow channel in each filter element is substantially straight and the centrifugal chambers communicate with one side of the flow channel.

3. A filter as claimed in claim 1 in which each filter element at its opposite ends has substantially plane parallel end surfaces, and a centring collar around the inlet and outlet of the flow channel.

4. A filter as claimed in claim 1 in which the outlet pipes of each centrifugal chamber each have a nozzle-shaped outlet.

5. A filter as claimed in claim 1 in which a distributor having radial blading is provided between the adjacent inlet ends of the outlet pipes in each centrifugal chamber.

6. A filter as claimed in claim 1 in which each flow channel is curved in an undulatory manner within the filter element and the centrifugal chambers communicate with the flow channel in concave regions of the latter.

7. A filter as claimed in claim 6, in which at least n identical flow channels are provided, wherein n is greater than 1; the filter element is assembled from n+1 castings which on their opposing longitudinal sides are furnished with the boundary contours of the flow channels and the centrifugal chambers attached to them, and the castings are disposed between parallel, plate-like boundary walls which carry the purified gas outlet pipes from the chambers.

8. A filter as claimed in claim 1, in which each filter element is divided longitudinally and transversely to the axes of the centrifugal chambers communicating therewith.

9. A filter as claimed in claim 8 in which each filter element is divided symmetrically about a longitudinally extending plane.

10. A filter as claimed in claim 8, in which the two parts of each filter element are made by die casting or injection moulding.

11. A filter as claimed in claim 8 in which the outlet pipes of each centrifugal chamber are integral with the two parts of the respective filter element.

* * * * *